US009385576B2

(12) United States Patent
Jiang et al.

(10) Patent No.: US 9,385,576 B2
(45) Date of Patent: Jul. 5, 2016

(54) ROTATORY DEVICE END CAP WITH UNPACKAGED FILTERS

(71) Applicant: Johnson Electric S.A., Murten (CH)

(72) Inventors: Maoxiong Jiang, Shenzhen (CN); Tongjie Li, Shenzhen (CN); Qingbin Luo, Shenzhen (CN); Xinpeng Wei, Shenzhen (CN); Huiting Zhong, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 282 days.

(21) Appl. No.: 13/971,807

(22) Filed: Aug. 20, 2013

(65) Prior Publication Data

US 2014/0049126 A1 Feb. 20, 2014

(30) Foreign Application Priority Data

Aug. 20, 2012 (CN) .......................... 2012 1 0296857

(51) Int. Cl.
*H02K 5/24* (2006.01)
*H02K 11/02* (2016.01)
*H02K 11/00* (2016.01)

(52) U.S. Cl.
CPC .......... *H02K 11/0005* (2013.01); *H02K 11/026* (2013.01)

(58) Field of Classification Search
CPC ... H02K 11/00; H02K 11/0005; H02K 11/02; H02K 11/024; H02K 11/026
USPC ........ 310/72, 154.08, 220, 71, 67 R, 89, 239, 310/240, 249
See application file for complete search history.

(56) References Cited

U.S. PATENT DOCUMENTS

| 3,594,598 | A | * | 7/1971 | Schaub | 310/220 |
| 4,323,804 | A | * | 4/1982 | Zelt | H02K 11/022 310/154.08 |
| 5,313,126 | A | * | 5/1994 | Forsythe et al. | 310/51 |
| 5,548,169 | A | * | 8/1996 | Iwasa | H02K 17/30 310/68 R |
| 6,078,117 | A | * | 6/2000 | Perrin et al. | 310/68 R |

(Continued)

FOREIGN PATENT DOCUMENTS

| DE | 19902433 | * | 9/2000 |
| DE | 102004037912 | * | 4/2006 |
| WO | WO 2008/098681 | * | 8/2008 |

OTHER PUBLICATIONS

Machine translation for DE 102004037912.*

(Continued)

*Primary Examiner* — Dang Le
*Assistant Examiner* — Ahmed Elnakib
(74) *Attorney, Agent, or Firm* — Muncy, Geissler, Olds & Lowe, P.C.

(57) ABSTRACT

A rotatory device (1) for energy conversion between electrical energy and mechanical energy includes an end cap (20) to which electric conduction and commutation components (30) are attached. The end cap (20) is electrically insulating and has a flange mating to an electric conductive housing (10) of the rotatory device (1). An unpackaged capacitor (40) is positioned between the housing (10) and the flange (20) without occupying other space inside the housing (10) of rotatory device (1). The unpackaged capacitor (40) is electrically coupled to the electric conduction and commutation component and grounded to the housing (10) of the rotatory device (1).

17 Claims, 6 Drawing Sheets

(56) References Cited

U.S. PATENT DOCUMENTS 6,300,696 B1 * 10/2001 Wong .................. 310/68 R
7,375,452 B2 * 5/2008 Kuechen et al. ............ 310/233
2009/0160268 A1 * 6/2009 Ragnone .............. H01R 4/4809
310/51

OTHER PUBLICATIONS

Machine translation for DE 19902433.*
Machine translation for WO 2008/098681.*
English translation of DE102004037912; germany; Apr. 2006; Bernauer Christof.*
Dictionary.com, definition of "sandwich"; printed Jan. 13, 2016.*
Capacitance in series and in parallel. farside.ph.utexas.edu; Dec. 24, 2011.*
Johansondielectrics.com; X2Y filters; printed Jan. 2016.*
3M, Electronic Solutions Division, "3M Embedded Capacitance Material (ECM)", 2013, 2 pages url: http://multimedia.3m.com/mws/mediawebserver?66666UuZjcFSLXTtmXM6L8TXE-VuQEcuZgVs6EVs6E666666-.

* cited by examiner

ROTATORY DEVICE END CAP WITH UNPACKAGED FILTERS

CROSS REFERENCE TO RELATED APPLICATION(S)

This application claims the benefit of Chinese patent application serial no. 201210296857.3 having a filing date of Aug. 20, 2012. The entire content of the aforementioned patent applications is hereby incorporated by reference for all purposes.

BACKGROUND

A rotatory device such as an electric motor or a generator may generate noise or electromagnetic interferences (EMI) during operation due to vibration of the rotatory device or due to commutation when brushes contact and traverse the gap(s) of the commutator. The vibrations or the engagement and disengagement between brushes and the commutator may cause unstable or less-than-desired electrical contact or variations in electrical conduction between the brushes and the commutator and thus cause noise or EMI.

A conventional rotatory device usually includes some decoupling capacitors disposed between the power source and ground to eliminate EMI or noise. Capacitors may nonetheless deviate from an ideal capacitor equation (e.g., a parallel-plate model for capacitors) in a variety of manners. For example, a capacitor may exhibit a non-linear or non-uniform behavior due to its dependence on temperatures such as operating or storage temperatures, aging effects, etc. Certain applications including the use of capacitors may also demand high temperature reliability or stability of these capacitors. Capacitors that exhibit stable or reliable capacitance at higher temperatures do exist. For example, mica or glass capacitors usually exhibit reliable and stable temperature performance. These capacitors that may tolerate higher temperatures are generally expensive for many applications. In addition or in the alternative, some applications may require components, including capacitors, to take less space or even as little space as practically possible or manageable to reduce the overall size of a package which may further lead to reduction in the production cost, while demanding the same performance characteristics.

Therefore, there exist a need for a rotatory device having one or more decoupling capacitors to effectively suppress noise or EMI, while exhibiting good stability or reliability during high temperatures without occupying valuable design space or increasing manufacturing costs.

SUMMARY OF THE INVENTION

Some embodiments are directed at a rotatory device including an end shield, end bracket, or end bell (collectively an end cap hereinafter) and at least one unpackaged capacitor. In some embodiments, an end cap refers to at least a part of the housing or frame (collectively housing hereinafter) of a rotatory device and supports various components (e.g., bearing(s) or sleeve(s) for an output shaft of a rotatory device, brushes of a brushed rotatory device, an electronic controller of a brushless rotatory device, a rotor (e.g., rotating magnets) or a stator (e.g., a fixed armature) of a brushless rotatory device, etc.) of the rotatory device. In addition to accommodating the internal components of a rotatory device, an end cap together with the housing may also serve as a protective guard to the electrical (e.g., various leads, circuitry, etc.) and or mechanical components (e.g., various rotating or stationary parts such as the rotor, the stator, etc.) inside the rotatory device.

A rotatory device may comprise an energy conversion element having a rotation shaft, a housing comprising a sidewall surrounding the energy conversion element, a first end cap on one end (e.g., the front end or the rear end) of the rotatory device in some embodiments. In some of these embodiments, the first end cap may be attached to the housing and comprises a first flange. The first end cap may further comprise an electric conduction component disposed on the first end cap and operatively coupled to the energy conversion element. In some embodiments, a rotatory device may comprise two end caps on both the front end and the rear end of the rotatory device. For example, a rotatory device may include an end cap on the front side with bearing(s) or sleeve(s) to accommodate the shaft (e.g., the output shaft of an electric motor) as well as another end cap on the rear side upon which a fan subassembly may be optionally attached to provide cooling to the rotatory device. An end cap may be made of a dielectric material to provide electric insulation in some embodiments or a metallic material in some other embodiments.

In some embodiments, the rotatory device may comprise at least one unpackaged capacitor sandwiched between the first flange of the first end cap and the housing. In some of these embodiments, the at least one unpackaged capacitor includes a first metallic component electrically coupled to the electric conduction component, a second metallic component grounded to the housing, and a dielectric component at least a part of which is enclosed between the first metallic component and the second metallic component to form a capacitor element. A electric conduction component may comprise a brush or a commutation device in some embodiments described below. In some of these embodiments, the electric conduction component may further comprise a first interconnection component disposed on an end cap and connected to a brush or commutation device and to the first metallic component of the at least one unpackaged capacitor. In addition, the electric conduction component may further comprise an interconnect component disposed on the end cap and operatively coupled to the at least one unpackaged capacitor and the brush or commutation device.

The first flange may extend in a direction parallel to the rotation shaft of the energy conversion element in some embodiments. In some of these embodiments, the first unpackaged capacitor may have a cross-sectional profile having multiple bends between the first flange and an interior side of the sidewall of the housing. In some of these immediately preceding embodiments, the first unpackaged capacitor may have a cross-sectional profile having two obtuse bends between the first flange and the interior side of the sidewall of the housing. The housing may further include a flange perpendicular to the rotation shaft of the energy conversion element in some embodiments. In these embodiments, the first flange of the end cap may extend perpendicularly to the rotation shaft of the energy conversion element; and the first unpackaged capacitor may also include a portion sandwiched between the flange of the housing and the first flange of the end cap.

In addition or in the alternative, the rotatory device may include a second unpackaged capacitor having a third metallic component electrically coupled to the electric conduction component, and a fourth metallic component electrically coupled to the housing in some embodiments. In some of these embodiments, the end cap may further comprise a second flange, and the second unpackaged capacitor is sandwiched between the second flange of the end cap and the housing of the rotatory device. In some of these embodiments, the electric conduction component may include a first brush and a second brush, where the first metallic component of the first unpackaged capacitor is electrically coupled to the first brush of the electric conduction component, and the third metallic component of the second unpackaged capacitor is electrically coupled to the second brush of the electric conduction component.

It shall be noted that commercially available capacitors usually come in various packages such as surface-mount device (SMD) packages (e.g., SMD ceramic capacitor packages for surface-mount technology (SMT), SMD tantalum capacitor packages for SMT, etc.) or through-hole capacitor packages (e.g., through-hole tantalum capacitor packages or through-hole electrolytic capacitor packages, etc.) where the metallic and dielectric components of a capacitor are usually encapsulated within an outer casing with lead wires or electrical contacts outside the outer casing for placing the capacitor in an electrical network.

For example, conventional capacitors may be encapsulated in epoxy, resin, conformal coating, or any other suitable types of materials to withstand insertion, soldering, or solvent cleaning processes by automatic printed circuit board (PCB) assembly equipment. In some embodiments described herein, the unpackaged capacitor does not have such encapsulation. In some of these embodiments, an unpackaged capacitor does not even have the wire leads (for through-hole technology capacitors) to be inserted in a circuit or the electric contacts (e.g., pins, leads, solder balls, etc.) to be inserted into a circuit via surface mount technology. In some of these embodiments, the first metallic component of an unpackaged capacitor is operatively coupled to the brushes, and the second metallic component of the unpackaged capacitor is operatively grounded or earthed by, for example, connecting to the housing of the rotatory device. A brush contacts a commutator to conduct electrical energy in or out of a rotatory device.

It shall be noted that some embodiments are directed at rotatory devices having brushes. Nonetheless, some other embodiments may also be directed at brushless devices (e.g., a brushless direct-current motor) to include one or more unpackaged capacitors as described herein to perform with full and equal effects all of the functions described herein such as, suppressing electromagnetic interferences, functions for capacitor-run, functions for capacitor-start, functions for reducing space requirements inside these brushless rotatory device, any combinations thereof, etc. Consequently, a brush described herein may refer to a brush in, for example, a brushed electric motor generally refers to a commutation device (e.g., a brush in a brushed electric motor or an electronic controller or solid-state circuitry replacing the brush and commutator assembly of a brushed electric motor for commutation, or even sensors such as Hall-effect sensors that determine the rotor's position of a brushless electric motor) for commutation purposes. Throughout this application, the terms "brush" and "commutation device" are used interchangeably, unless otherwise specifically recited or claimed.

In some embodiments, the rotatory device may further include brushes that are attached to the end cap for conducting electrical energy into or out of the rotatory device. In these embodiments, the at least one unpackaged capacitor may be disposed between the end cap and a part of the housing of the rotatory device. In addition, the end cap of the rotatory device may further include an end metallic portion (e.g., a metallic plate or a metallic cylindrical skirt) whose normal direction is substantially perpendicular to the axis of the rotor of the rotatory device such that at least a portion of the first metallic component of the at least one unpackaged capacitor is attached to a substantially flat or curved surface of the end metallic portion of the end cap in some embodiments.

The first metallic component may be electrically coupled to the brushes through various types of electrical connections, and the end cap may also be otherwise electrically isolated such that only the designated components (e.g., the brushes, the first and the second metallic components, the interconnects, etc.) remain electrically live during operations of the rotatory device in these embodiments. In some of these embodiments, the second metallic component may be grounded or earthed by overlaying the second metallic component along at least a portion of the end cap so as to contact the housing of the rotatory device. The dielectric component of the at least one unpackaged capacitor may be enclosed between the first metallic component and the second metallic component in these embodiments.

In some embodiments, an end cap may further comprise multiple terminals or connectors to electrically connect electrical energy into and out of the rotatory device through the brushes. These multiple terminals or connectors may be electrically coupled inside the end cap to electrically couple the brushes as well as the first metallic component and the second metallic component of the unpackaged capacitor. In some embodiments, the electrical connection between brushes and the first metallic component of the at least one unpackaged capacitor may be achieved by disposing an interconnect component between the first metallic component and the brushes.

In some of these embodiments, the end cap of the rotatory device may include the interconnect component upon which the brushes are disposed, and the interconnect component may be further electrically coupled to the first metallic component of the unpackaged capacitor. The end cap may be attached to an opening on one end of the housing of the rotatory device and form, together with the housing, a protective casing for the internal components (e.g., the brushes, circuitry, the commutator, etc.) of the rotatory device in some embodiments.

In various embodiments where exemplary rotatory devices include at least one unpackaged capacitor, the use, position, or configuration of the at least one unpackaged capacitor reduces the amount of space needed for placing the capacitor(s) inside the housing of the rotatory device. These embodiments utilize the space in the vicinity of the end cap where the end cap attaches to the housing of the rotatory device to fit at least one unpackaged capacitor and thus need not reserve additional space in the end cap or the rotatory device for the at least one unpackaged capacitor.

For example, some embodiments may attach an unpackaged capacitor to a flange of the end cap such that a first metallic component (e.g., the metallic component on the inside of the flange facing the interior of the end cap) of the unpackaged capacitor is electrically coupled to the brushes while the second electrical component is disposed on or near the outside of the flange facing the exterior of the end cap to be earthed or grounded by being electrically coupled to the housing of the rotatory device. In these embodiments, the rotating or spinning magnetic field inside the rotatory device (e.g., a spinning electromagnet in a brushed motor or a spinning solid-state magnet in a brushless direct-current motor) induces an alternating electric field into the metallic body of the rotatory device.

The average potential of this magnetic field may be zero, but the instantaneous potential may be high. These unpackaged capacitors may thus leech this electric field away from the body before this electric field may radiate out from the body and thus reducing the electromagnetic interferences with, for example, surrounding electronics. The reduction in space needed to accommodate capacitors may further lead to reduction in cost, without compromising the performance characteristics of suppressing the electromagnetic interference. The configuration, disposition, and/or positioning of the unpackaged filters also exhibit more robustness in maintaining better stability or reliability of capacitances at elevated temperatures, without having to incur the extra cost of expensive high-temperature capacitors such as mica or glass capacitors.

More details about the rotary device are described in the Detailed Description section with reference to FIGS. 1-8 as provided below.

BRIEF DESCRIPTION OF THE FIGURES

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Various features are described hereinafter with reference to the figures. It shall be noted that the figures are not necessarily drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Some embodiments are directed at a rotatory device for conversion between electrical energy and mechanical energy, the rotatory device including a housing comprising a sidewall, an end cap attached to the housing and comprising a first flange protruding along a height direction of the end cap, and a first unpackaged capacitor grounded to the housing and disposed between the first flange and an interior side of the sidewall. In some of these embodiments, the rotatory device further including a first brush attached to a bottom surface of the end cap and operatively coupled to the first unpackaged capacitor. In some of these latter embodiments, the rotatory device may further include an interconnect component disposed on the end cap and operatively coupled to the first unpackaged capacitor and the first brush.

In addition or in the alternative, the first unpackaged capacitor may include a first metallic component, a second metallic component, and a dielectric component sandwiched between the first metallic component and the second metallic component in some embodiments. In some of these embodiments, the first metallic component may comprise a first metallic film, and the second metallic component comprising a second metallic film. In some embodiments where the first unpackaged capacitor includes a first metallic component and the second metallic component, the first metallic component is electrically coupled to the first brush, and the second metallic component is electrically coupled to the housing of the rotatory device. In some embodiments where the unpackaged capacitor includes the first metallic component, the second metallic component, and the dielectric component, the first unpackaged capacitor may further comprise a cross-sectional profile having multiple bends between the first flange and the interior side of the sidewall of the housing. The final dimensions of an unpackaged capacitor may be custom tailored from a sheet of raw materials to fit specific design criteria. It shall be noted that the top metallic layer may include a film-like structure in some embodiments. In some embodiments, an unpackaged capacitor may actually comprise a relatively flexible (e.g., capable of being manipulated by hands) film-like capacitor. Nonetheless, an actual unpackaged capacitor may not necessarily be film-like or flexible at all in some other embodiments. In these embodiments, an unpackaged capacitor may include at least one first metallic plate, a second metallic film or plate, and a dielectric layer that is pre-formed (e.g., by various molding processes) to be sandwiched between the first metallic plate and the second metallic film or plate.

In some embodiments where the rotatory device includes the housing, the end cap, and the first unpackaged capacitor, the rotatory device may further comprise a second unpackaged capacitor grounded to the housing and disposed between a second flange and the interior side of the sidewall of the housing. In some of the immediately preceding embodiments, the rotatory device may further include a second brush attached to the bottom surface of the end cap and operatively coupled to the second unpackaged capacitor, and a first interconnect component disposed on the end cap and operatively coupled to the second unpackaged capacitor and the second brush. In some embodiments where the rotatory device includes the second unpackaged capacitor, the first flange and the second flange may constitute two different portions of an single, integral flange of the end cap.

Some first embodiments are directed at an electric motor that comprises a rotor and stator assembly having a rotation shaft, a commutator attached to the rotation shaft of said rotor stator assembly, a housing having a sidewall surrounding said rotor and stator assembly have an open end, an end cap attached to the open end of said housing and having a first flange, a first brush assembly disposed on said end cap and operatively coupled to said commutator, a first unpackaged capacitor sandwiched between the first flange of said end cap and said housing and having a first metallic component electrically coupled to said first brush assembly and a second metallic component electrically coupled to said housing. In some of these embodiments, the first unpackaged capacitor includes a dielectric layer sandwiched between said first metallic component and said second metallic component. In addition or in the alternative, the first brush may include a brush holder attached to said end cap and a brush slidably attached to said brush holder, wherein the first metallic component is electrically coupled to the brush of the first brush assembly.

In some embodiments, the electric motor may further comprise an interconnect component that is disposed on the end cap and is electrically connected to the first brush assembly. In these embodiments, the first metallic component of the first unpackaged capacitor may include a portion in contact with the interconnect component, and the second metallic component of the first unpackaged capacitor may have a portion in contact with the housing of the electric motor. In some embodiments, the end cap has the first flange extending parallel to the rotation shaft of said rotor and stator assembly, and the first unpackaged capacitor has a cross-sectional profile with multiple bends between the first flange of the end cap and an interior side of the sidewall of the housing with a portion of the second metallic component thereof in contact with the interior side of the housing. In some of the immediately preceding embodiments, the first unpackaged capacitor has a cross-sectional profile having two obtuse bends between the first flange and the interior side of the sidewall of the housing.

In some of the first embodiments, the housing includes a flange adjacent to the open end thereof and perpendicular to the rotation shaft of the rotor and stator assembly; the end cap includes the first flange extending perpendicularly to said rotor and stator assembly and secured to the flange of said housing; and the first unpackaged capacitor includes a portion sandwiched between the flange of the housing and the first flange of the end cap. In some of the immediately preceding embodiments, the electric motor may further include an interconnect component disposed on the end cap and electrically connected to the first brush assembly, wherein the first metallic component of said first unpackaged capacitor has a portion in contact with said interconnect component, and the second metallic component of the first unpackaged capacitor has a portion in contact with the housing.

In some of the first embodiments, the electric motor may further include a second brush assembly disposed on the end cap and operatively coupled to the commutator and a second unpackaged capacitor having a first metallic component electrically coupled to the second brush assembly and a second metallic component electrically coupled to the housing of the electric motor. In some of the immediately preceding embodiments, the end cap further has a second flange, and the second unpackaged capacitor is sandwiched between the second flange of said end cap and said housing.

Some embodiments are directed at a method for performing conversion between energy of a first form and energy of a second form with a rotary device. In these embodiments, the method may comprise receiving the energy of the first form from an external source, transmitting the energy of the first form to a first commutation device of the rotary device during a first period of time, during the first period of time, charging a first unpackaged capacitor operatively coupled to the first commutation device, and reducing electromagnetic interferences by at least discharging the first unpackaged capacitor during a second period of time.

In some embodiments, the method converts electric energy into mechanical energy such as in the case of using an electric motor. In some embodiments, the method converts mechanical energy into electric energy such as in the case of using an electric generator. In some embodiments, the method may perform the act of charging the first unpackaged capacitor during a period of time when the electric current flowing through the circuit including the first unpackaged capacitor remains relatively stable. In some embodiments, the method may perform the act of reducing electromagnetic interferences by at least discharging the first unpackaged capacitor, which has been charged to store energy therein, during a second period of time when the electric current flowing through the circuit exhibits some fluctuations due to, for example, vibration or commutation where a commutation device (e.g., a brush) traverses across two commutator plates of a commutator. In some of these embodiments, the method may further include transmitting the energy of the first form to a second brush of the rotary device, charging a second unpackaged capacitor operatively coupled to the second brush, and reducing the electromagnetic interferences by at least discharging the second unpackaged capacitor.

In some of the embodiments, the method may further include grounding the first unpackaged capacitor by operatively coupling the first unpackaged capacitor to a housing of the rotary device, and grounding the second unpackaged capacitor by operatively coupling the second unpackaged capacitor to the housing of the rotary device. In addition or in the alternative, the method may include converting the energy of the first form into the energy of the second form by at least coupling the first commutation device and the second commutation device to a commutator, and outputting at least a portion of the energy of the second form. In some of these embodiments, the first commutation device and the second commutation device generally refer to a commutation device (e.g., a brush in a brushed electric motor or an electronic controller or solid-state circuitry replacing the brush and commutator assembly of a brushed electric motor for commutation, or even sensors such as Hall-effect sensors that determine the rotor's position of a brushless electric motor) for commutation purposes.

In some of the embodiments, the method may further include providing an initial torque by serially connecting a third unpackaged capacitor controlled by a relay to the rotary device to shift an electrical phase of the rotary device. For example, the method may use an unpackaged capacitor that is electrically coupled to the startup winding of the rotary device in series, to shift a motor's electrical phase slightly to create a starting torque to start the motor in some embodiments. In some of these embodiments the method may further open a relay in a controller to remove the third unpackaged capacitor from the circuit as the motor approaches its operating speed and thus disengages the third unpackaged capacitor from the circuit to drive, for example, the armature of the motor. In some of these embodiments, the method may further include running the rotary device by using at least one fourth unpackaged capacitor as a run capacitor to take on the load on the rotary device after the method determines that the rotary device is spinning or rotating at a certain speed (e.g., a predetermined percentage of the as-designed operating speed of the rotary device or a predetermined period of time after start).

In some of the embodiments, the method may further include improving at least one of a plurality of characteristics of the rotary device by serially connecting a fourth unpackaged capacitor to the rotary device to shift an electrical phase of the rotary device. In the above example including a third unpackaged capacitor as a starting capacitor, the method may cause the relay to open (e.g., by sending a signal via a controller) to remove the third unpackaged capacitor from the circuit when the rotary is spinning or rotating at a certain speed without removing the fourth unpackaged capacitor, which may be operatively connected to the third capacitor in series and serves as a run capacitor, from the circuit. In this example, the method may continue to drive the rotatory device by using the fourth unpackaged capacitor that may be devised to run indefinitely while the third unpackaged capacitor serving as a starting capacitor is devised to start and then stop when the rotatory device is running at a certain speed.

In some of the embodiments, the method may further include reducing a size of the rotatory device by positioning at least a portion of the first unpackaged capacitor between a housing of the rotatory device and a flange protruding along a height direction of an end cap of the rotatory device. In the above examples for the third or the fourth unpackaged capacitor, the method may use the fourth unpackaged capacitor having a smaller capacitance value to take over the load because less capacitance may be needed at the operating speed in some embodiments. The method may thus improve several characteristics of the rotatory device. For example, the method may increase the efficiency of the rotatory device, reduces the current draw, renders the operation smoother, or reduces noise or vibration by using the third unpackaged capacitor, the fourth unpackaged capacitor, or both.

Some embodiments are directed at a rotatory device for conversion between electrical energy and mechanical energy. In some embodiments, the rotatory device may include means for protecting internal components of the rotatory device, wherein the means for protecting the internal components comprises a sidewall along an axis of a shaft of the rotatory device, means for attaching a first commutation device, wherein the means for attaching the first commutation device includes a first flange protruding along the axis of the shaft and is attached to the means for protecting internal components of the rotatory device to jointly protect the internal components of the rotatory device, and a first unpackaged capacitor grounded to the means for protecting the internal components and disposed between the first flange and an interior side of the sidewall. In some embodiments, the means for protecting internal components of the rotatory device may include a housing, a frame, or any equivalent of the rotatory device as described in the Detailed Description section. In some embodiments, the means for means for attaching the first commutation device may include an end cap or any equivalent of the rotatory device as described in the Detailed Description section.

In some of the immediately preceding embodiments, the rotatory device may further include the first commutation device attached to a bottom surface of the means for attaching a first commutation device and operatively coupled to the first unpackaged capacitor, a second unpackaged capacitor grounded to the means for protecting the internal components and disposed between a second flange disposed on the means for attaching the first commutation device and an interior side of the sidewall, and a second commutation device attached to the bottom surface of the means for attaching a first commutation device and operatively coupled to the second unpackaged capacitor. In the alternative, the rotatory device may include means for interconnecting the first unpackaged capacitor and the first commutation device for commutation in some of the immediately preceding embodiments.

One aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Some embodiments are directed at a rotatory device that is to convert electrical energy (e.g., electrical current) into mechanical energy (e.g., mechanical, rotational force or torque) or vice versa. The rotatory device may include, for example but not limited to, a brushed motor, which receives and converts electrical energy into mechanical, rotatory energy, or an electricity generator, which receives and converts mechanical energy into electrical energy (e.g., electrical potential, electromotive force, etc.), that includes a commutator and brushes. In some of the embodiments, the commutator includes a plurality of commutator plates or elements (collectively plates or plate) arranged in an angular direction, and each of the brushes comprises one or more features made of one or more electrically conductive materials.

In some of these embodiments, the rotatory device may include an end cap and at least one unpackaged capacitor. An end cap refers to at least a removable part of the housing of a rotatory device that is attached to the housing to support or accommodate various components (e.g., bearing(s) for an output shaft of an electric motor) of the rotatory device. An end cap may, together with the housing, serve as a protective guard to the electrical (e.g., various leads or circuitry) and or mechanical components (e.g., various rotating or stationary parts) inside the rotatory device. In these embodiments, the at least one unpackaged capacitor includes a first metallic component, a second metallic component, and a dielectric component at least a part of which is enclosed between the first metallic component and the second metallic component to form a capacitor element.

The first metallic component and the second metallic component may comprise a planar or curved metallic film, foil, plate, or any combination thereof in some embodiments. The shape or dimensions of the first metallic component or the second metallic component may be determined based at least in part upon the dimensions of the features to which the unpackaged capacitor is attached. For example, a substantially flat, unpackaged capacitor (and hence a substantially flat first metallic component, a substantially flat second metallic component, and a substantially flat dielectric component) may be devised to attach to a substantially flat flange disposed on the end cap in some embodiments. As another example, a curved, unpackaged capacitor (and hence a curved first metallic component, a curved second metallic component, and a curved dielectric component) may be devised to attach to conform to a curved flange disposed on the end cap in some embodiments.

In addition or in the alternative, each of the individual components may be flexible or rigid with different moduli or materials of choice that may be determined based at least in part upon one or more electrical characteristics of the capacitor or one or more operating requirements in some embodiments. The one or more electrical characteristics may include, for example but not limited to, the tolerance of the capacitor (e.g., ±5%, +10%, or ±20%) in some embodiments. The one or more operating requirements may include, for example but not limited to, operating temperature(s), amount of current, etc.

In some of these embodiments, the dielectric component may comprise a planar or curved dielectric film, foil, plate of various materials of choice. For example, the dielectric component may comprise a non-polarized electrolytic material, a piece of paper, an oil-filled paper, a piece of plastic or polymeric material, ceramic material, glass material, mica material, etc. that exhibit as high a permittivity or a breakdown voltage as possible or as low dielectric absorption or leakage as possible in some embodiments. The choice of the dielectric material may be determined based at least in part upon the aging requirement(s), the tolerance requirement(s), the temperature requirement(s), the resonance frequency requirement(s), the operating voltage(s) or current(s), cost, ease of manufacturing or assembly, or any combinations thereof in some embodiments. In some other embodiments, the first metallic component or the second metallic component may comprise a layer of metallic coating on the two sides of the dielectric component by, for example, spraying, deposition, or any other suitable manufacturing processes.

In various embodiments, an unpackaged capacitor does not include any encapsulation or outer casing of, for example, epoxy, resin, conformal coating, or any other suitable types of encapsulation materials usually found in conventional capacitors. Rather, an unpackaged capacitor may include only the two metallic components and the dielectric component. Nonetheless, it shall be noted that an unpackaged capacitor may also be protected by certain outer layers (e.g., an additional layer of material) to protect the unpackaged capacitor from possible abrasion or damage during insertion, soldering, mounting, or cleaning. An unpackaged capacitor may also be referred to as an embedded capacitance material including a dielectric layer having a thickness ranging from few micro-meters thick to tens of micro-meters thick. The dielectric layer is sandwiched between two electrically isolated metallic layers to form a capacitor element that provides a capacitance per unit area ranging from less than one to several hundred $nF/in^2$. With such a range of thickness, such an unpackaged capacitor may be relatively pliable to be embedded or formed on or around various geometric features. Nonetheless, it shall be noted that an unpackaged capacitor is not necessarily limited to having such a thin dielectric layer. In some embodiments, an unpackaged capacitor may have a dielectric layer having a thickness beyond the range provided above such that the unpackaged capacitor is not pliable yet may still be embedded or formed on or around certain geometric features. Such a non-pliable unpackaged capacitors may be formed by using various shape forming technologies (e.g., various molding processes or machining) to manufacture the dielectric layer that is to be attached to the metallic layers to form the capacitor elements.

In some embodiments where an exemplary rotary device includes some unpackaged capacitors, these unpackaged capacitors may be used as decoupling capacitors to suppress or reduce electromagnetic interferences or noise. For example, a first unpackaged capacitor operatively connected to a first brush or a first commutation device may be charged during a period of time when the first brush or the first commutation device is operatively connected to a positive power source during commutation. The first unpackaged capacitor acts as an energy storage by subsequently discharging its stored energy in response to changing current due to commutation where the first brush traverses from one commutator segment or plate to another during a second period of time or due to varying electrical contacts between the first brush and the commutator as a result of, for example, vibrations. As a result of the first unpackaged capacitor's discharging of its stored energy, electromagnetic interferences or noise is shunted through the first unpackaged capacitor in these embodiments. In some embodiments, the unpackaged capacitors serving as decoupling capacitors may also be grounded or earthed to, for example, the metallic portion of the housing of the rotary device to properly complete the circuit.

In some embodiments, an exemplary rotary device may also include one or more unpackaged capacitors to serve as starting capacitor. For example, an unpackaged capacitor may shift a motor's electrical phase slightly to create a starting torque to start the motor in some embodiments. In some of these embodiments as the motor approaches its operating speed, a relay in, for example, the controller opens to remove the unpackaged capacitor from the circuit. In some of these embodiments, the exemplary rotary device may further include one or more second unpackaged capacitors that serve as run capacitors and are connected in series with the one or more unpackaged capacitors serving as starting capacitors. In the example described above for the starting-capacitor, the relay opens to remove the one or more unpackaged capacitors when the rotary is spinning or rotating at a certain speed without removing the one or more second unpackaged capacitors serving as run capacitors. In the above example, the one or more second unpackaged capacitors are devised to run indefinitely while the one or more unpackaged capacitors serving as starting capacitors are devised to start and then stop. Because less capacitance may be needed at the operating speed, the one or more second unpackaged capacitors having smaller capacitance values may take over the load, and several characteristics of the rotary device may thus be improved. For example, the one or more second unpackaged capacitors increase the efficiency of the rotary device, reduces the current draw, renders the operation smoother, and reduces noise or vibration.

In some embodiments, an exemplary rotary device (e.g., a multi-phase induction motor) may include one or more unpackaged capacitors to serve as phase-shifting capacitors that are connected in series with a winding. It shall be noted that there are numerous other applications involving the use of one or more capacitors in a rotary device. The unpackaged capacitors may also be used to replace any of such one or more capacitors to reduce the space requirements because the an unpackaged capacitors may be disposed in very small space (e.g., between a mounting flange of an end cap and the housing or frame of a rotary device) that usually cannot be utilized to fit any electronic components due to its small space and/or due to the close proximity or presence of the metallic housing.

In some embodiments, noise is a summation of unwanted or disturbing energy from natural and sometimes artificially introduced sources (e.g., commutation in a brushed motor or generator due to the existence of a gap between two adjacent commutator plate, conductance fluctuations due to variations in contacts between the brushes and the commutator plates, etc.) Electromagnetic interference refers to, on the other hand, jamming, cross-talk, cross-coupling, capacitive coupling, or other undesired radio-frequency interferences from specific transmitter(s) or source(s) in some embodiments. Nonetheless, the terms "noise" and "electromagnetic interference" may be used interchangeably throughout this application, unless otherwise specifically claimed or recited.

Figure 1:
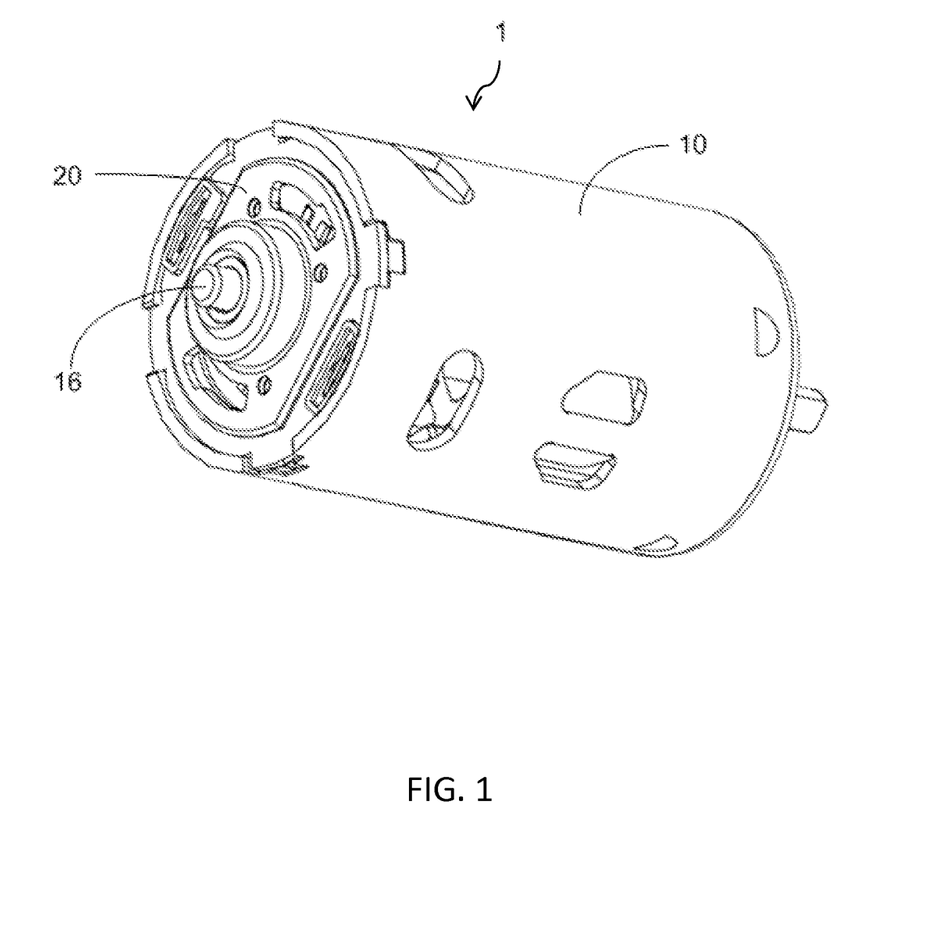
FIG. 1 illustrates an exemplary rotatory device in some embodiments.
Figure 2:
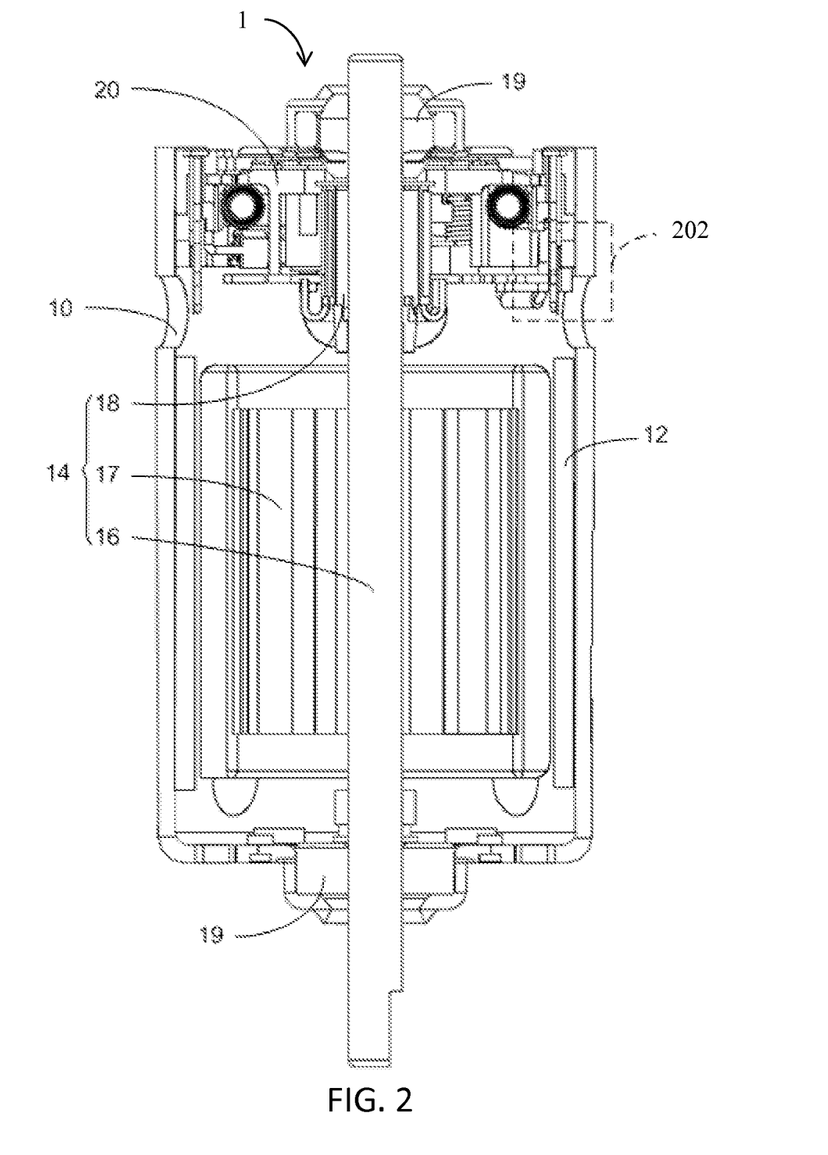
FIG. 2 illustrates a cross-sectional view of the exemplary rotatory device 1 illustrated in FIG. 1 in some embodiments.

FIG. 1 illustrates an exemplary rotary device in some embodiments. More specifically, the rotary device 1 may comprise a housing 10, an end cap 20, and an output shaft 16. FIG. 2 illustrates a cross-sectional view of the exemplary rotary device 1 illustrated in FIG. 1 in some embodiments. In these embodiments, the rotary device 1 includes the end cap 20, the housing 10, a permanent magnet or electro-magnet 12 disposed inside the housing 10, two bearings 19 near two ends of the shaft 16, and a rotor 14. More particularly, the rotor 14 may include the shaft 16, the armature 17, and a commutator 18. The armature 17 and the commutator 18 may be axially symmetrically arranged with respect to the shaft 16 such that the rotation or spinning of the armature 17 cause conversion between the electrical energy and the mechanical energy during operations of the rotatory device 1. FIG. 2 also shows an area 202 that will be described in the following paragraphs with reference to FIG. 5.

Figure 3:
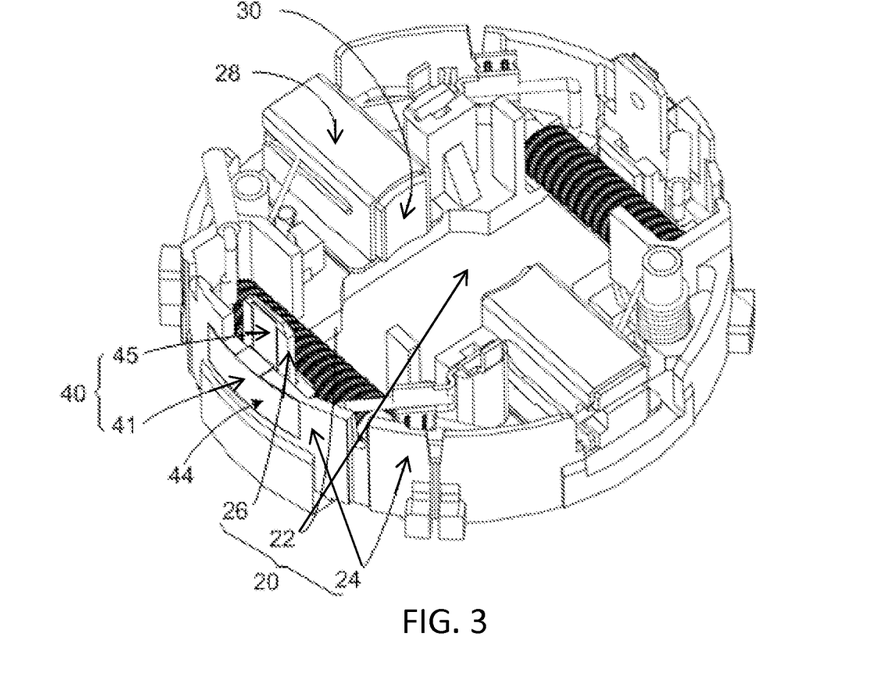
FIG. 3 illustrates an exemplary end cap of the exemplary rotatory device illustrated in FIG. 1 and some associated, exemplary components in some embodiments.

FIG. 3 illustrates an exemplary end cap 20 of the exemplary rotatory device illustrated in FIG. 1 and some associated, exemplary components in some embodiments. In these embodiments illustrated in FIG. 3, the exemplary end cap 20 may comprise an end plate 22, an outwardly extending flange 24, and an interconnect component 26. In some embodiments, the body of the end cap 20 may be made of a dielectric material with various features or components to secure the end cap 20 to the housing of the rotatory device 10. Various other features or components may be attached to or disposed on various portions of the end cap 20.

For example, the exemplary implementation illustrated in FIG. 3 includes the end cap 20 that may comprise a separably attached or inseparably formed brush holder 28, to which a brush 30 is attached. In some embodiments, the brush holder 28 may be removably attached to the end cap 20 such that the brush 30 attached to the brush holder 28 may be serviced with ease. For example, the brush holder 28 may be attached to the end cap 20 with a tong-and-groove mechanism and a retaining feature (e.g., a set screw, a spring-loaded retainer, etc.) to secure the brush holder 28 at desired locations.

End plate 22 may further include various protrusions or molded features to accommodate various other features or components of the rotatory device 1. One or more substantially flat or curved flanges 24 forms a part of the sidewall of the end cap 20 and may be used to position or secure end cap 20 to the housing 10 with a proper orientation. Separably attached or inseparably and integrally formed interconnect component 26 comprises an electrically conductive material and is used to electrically couple a brush 30 to a power source (e.g., a power supply of an electric motor) or a means for storing electrical energy (e.g., an rectifier for an electric generator) through appropriate interconnections therebetween.

Figure 4:
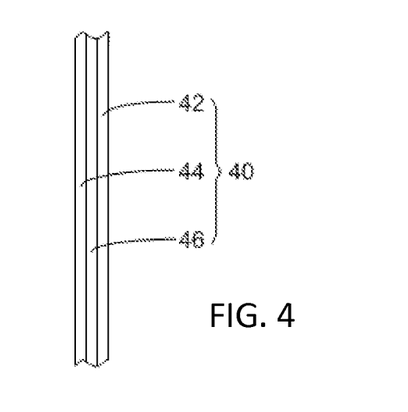
FIG. 4 illustrates a schematic illustration of a smaller portion of an unpackaged capacitor in some embodiments.
Figure 5:
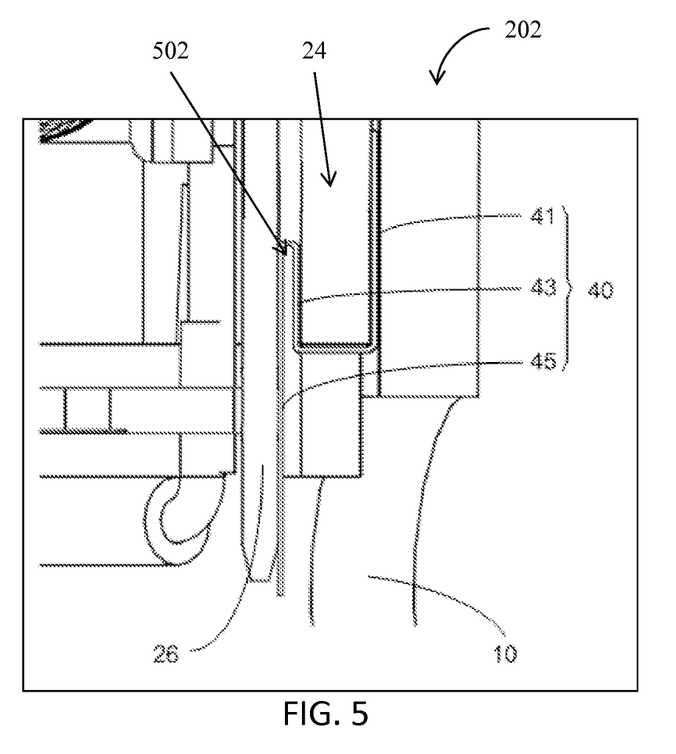
FIG. 5 illustrates a magnified view of the area 202 of FIG. 2 in some embodiments.

FIG. 4 illustrates a schematic illustration of a portion of an unpackaged capacitor 40 that includes a first metallic component 42, a second metallic component 44, and a dielectric component 46 in some embodiments. FIG. 5 illustrates a magnified view of the area 202 of FIG. 2 in some embodiments. With additional reference to FIGS. 4-5, the exemplary rotatory device 1 may include at least one unpackaged capacitor 40 that includes a first metallic component 42, a second metallic component 44, and a dielectric component 46.

In some embodiments, the first metallic component 42 or the second metallic component 44 may be made of an electrically conductive material including but not limited to aluminum, tantalum, copper, tin, or any other suitable materials for capacitors. In some embodiments, the dielectric component 46 may comprise a dielectric material including but not limited to a non-polarized electrolytic material, a piece of paper, an oil-filled paper, a piece polymeric material (e.g., polyester, polystyrene, polytetrafluoroethylene, etc.), a ceramic material, a glass material, a mica material, etc. that exhibit as high a permittivity or a breakdown voltage as possible or as low dielectric absorption or leakage as possible.

The dimensions of the dielectric material 46 or the metallic components (42 or 44) may be determined based at least in part upon the desired or required capacitance of the capacitor 40, the operating requirements (e.g., voltages or currents), the dimensions of the mating component(s) (e.g., the flange 24 or the interconnect component 26, etc.), or any combinations thereof. At least a portion of the capacitor 40 may be formed to conform to the external surface of the flange 24 such that at least a portion 41 of the second metallic component 44 covers at least a portion of the external surface (the surface that is further away from the interior of the end cap 20) of the flange 24. In some embodiments, the portion 41 of the second metallic component 44 may be attached to a portion of the external surface of flange 24 by using glue or other suitable processes.

In the embodiments illustrated in FIGS. 3-5, the unpackaged capacitor 40 may be formed in such a way that at least a portion 45 of the first metallic component 42 of the capacitor 40 may be attached to the interconnect component 26 to electrically couple the first metallic component 42 to the interconnect component 26 and hence to the brush 30. The at least a portion 45 of the first metallic component 42 may be attached to the interconnect component 26 by, for example but not limited to, various types of welding, brazing, soldering, or any other appropriate fabrication processes that join materials together in some embodiments.

In some other embodiments, the at least a portion 45 of the first metallic component 42 may be attached to the interconnect component 26 by mechanical means such that the contact resistance between the at least a portion 45 of the first metallic component 42 and the interconnect component 26 is sufficient low (e.g., a predetermined contact resistance without generating an excessive amount of heat that exceeds a predetermined threshold due to poor electrical contacts or without causing the temperature to rise above certain predetermined temperatures), or the contact stress therebetween is sufficiently high (e.g., a predetermined percentage of the yield strength of the first metallic component 42 or the interconnect component 26). FIG. 5 illustrates a magnified view of the area 202 of FIG. 2 in some embodiments. More specifically, FIG. 5 illustrates that a portion 41 of the second metallic component 44 is attached to the exterior side of flange 24, and that a portion 43 of the second metallic component 44 may be attached to an interior side (near the interior of the end cap 20) of flange 24. In these embodiments, the portion 41 attached to the exterior side of flange 24 is earthed or grounded by contacting the housing 10 of the rotatory device 1 when the end cap 20 is assembled onto the housing 10 or vice versa such that the portion 41 is sandwiched between the sidewall of the housing 10 and the flange 24.

In some embodiments, the portion 43 of the second metallic component 44 may be further secured to the flange 24 by, for example but not limited to, using glue or any other suitable processes to fixedly attach the portion 43 to the flange 24. In some embodiments, at least a portion of the unpackaged capacitor 40 may comprise an elastic or resilient structural feature 502 or a structure that introduces interferences between the portion of the unpackaged capacitor 40 and its mating part to accommodate slacks or tolerances arising out of various manufacturing or assembly processes in order to ensure proper electrical contact between the first metallic component 42 and the interconnect component 26.

In some embodiments, the first metallic component 42 comprises a geometric shape that is resilient so as to withstand shock or loading without substantially permanent deformation or rupture. It shall be noted that substantial permanent deformation occurs when unpackaged capacitor 40 loses its original shape to an extent that portion 45 of the first metallic component 42 is no longer capable of perform its intended functions of having sufficient electrical contact with the interconnect component 26. In some embodiments, the first metallic component 42 comprises a geometric shape that is elastic so as to recover its original shape or size after deformation due to, for example, shock or loading.

Figure 6:
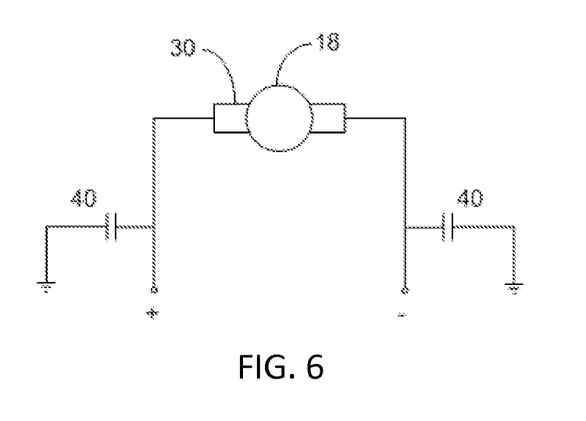
FIG. 6 illustrates an electrical schematic diagram of an exemplary rotatory device in some embodiments.

FIG. 6 illustrates an electrical schematic diagram of an exemplary rotatory device, such as, for example, the rotatory device 1 shown in FIG. 1, in some embodiments. More specifically, FIG. 6 illustrates a rotatory device having a commutator 18 and at least two brushes 30 operatively coupled to the commutator 18 for commutation. FIG. 6 further illustrates two capacitors (e.g., two unpackaged capacitors as described herein) that are operatively coupled to the brushes 30 and are further grounded or earthed via, for example, the housing of the rotatory device to suppress or eliminate noise or electromagnetic interferences.

In some of these embodiments where the exemplary rotatory device includes unpackaged capacitors, these unpackaged capacitors may be sandwiched between the interior sidewall of the housing of the rotatory device and the exterior wall of flange of the end cap of the rotatory device. Such a space between the housing and a flange of an end cap of a rotatory device is usually not used to accommodate any components. Therefore, the inclusion of such properly configured or devised unpackaged capacitors in a rotatory device reduces the overall size of the rotatory device without compromising the noise or EMI performance of the rotatory device. In addition or in the alternative, the inclusion of such unpackaged capacitors renders servicing these capacitors an easier task. Capacitors are known to exhibit an aging process so that the performance of capacitors deteriorates over time. Replacing such unpackaged capacitors may involve simply removal of the unpackaged capacitors without, for example, the de-soldering process and thus may avoid the possible damage to the circuitry due to the application of heat during the de-soldering process.

Figure 7:
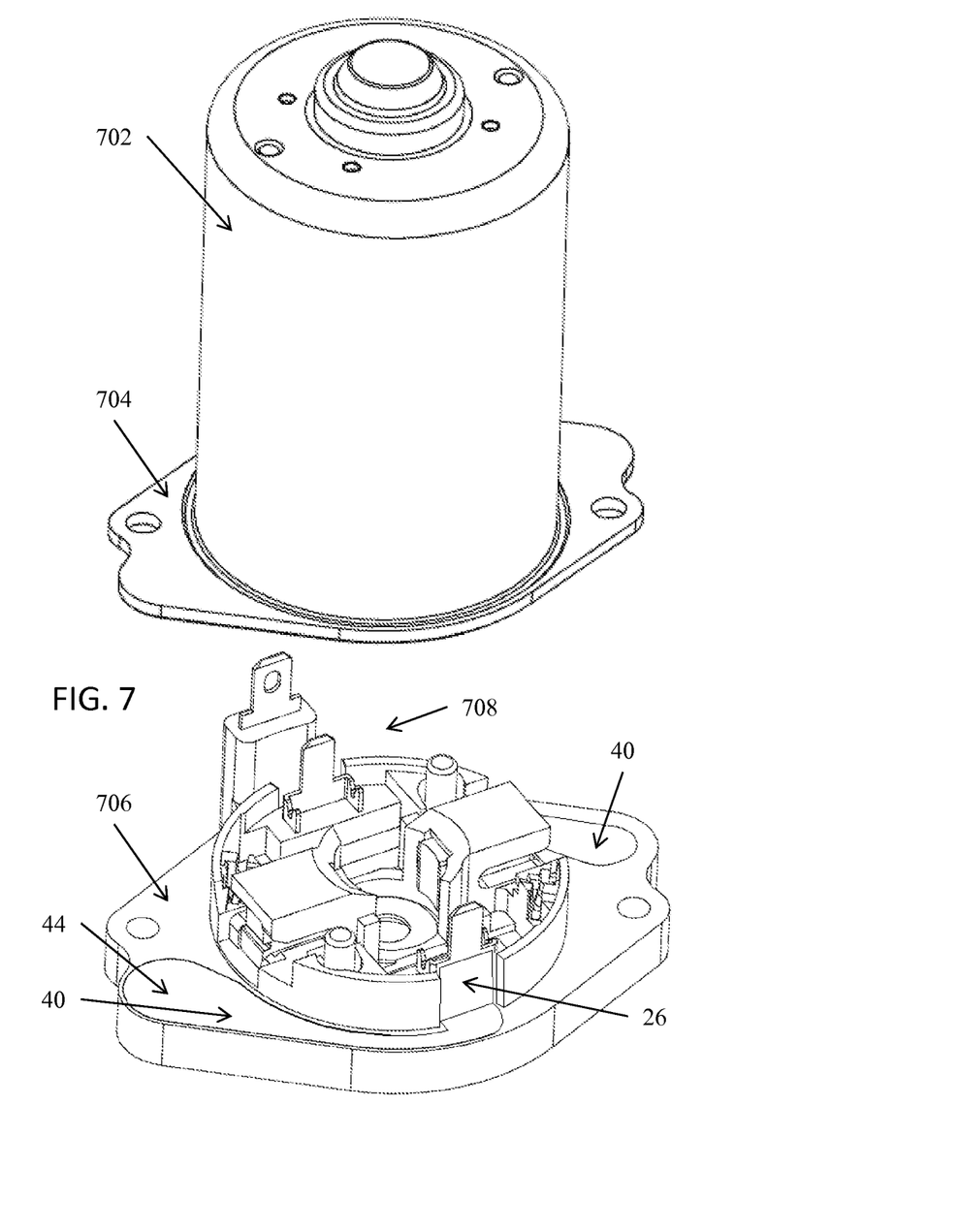
FIG. 7 illustrates a perspective, exploded view of an exemplary rotatory device in some embodiments.

FIG. 7 illustrates a perspective, exploded view of an exemplary rotatory device in some embodiments. In this exemplary rotatory device, the housing 702 may further comprise a separably attached or integrally, inseparably formed flange portion 704 that is to secure the end cap and attached components 708 by using a separably attached or integrally, inseparably formed flange portion 706 in these embodiments. Flange 704 of the housing 702 and flange 706 of the end cap extend along planes perpendicular to a rotation shaft of the rotator device shown in FIG. 7. In addition, flanges 704 and 706 match each other so that the end cap may be secured to the housing 702. In some embodiments illustrated in FIG. 7, an unpackaged capacitor 40 may be attached to the flange portion 706 of the end cap such that the second metallic component (e.g., reference numeral 44) of the unpackaged capacitor 40 may be earthed or grounded to, for example, the housing 702 via the flange portion 704. In some embodiments illustrated in FIG. 7, the first metallic component (e.g., the first metallic component 42 lying underneath the second metallic component 44 in FIG. 7) of an unpackaged capacitor 40 may be attached to the flange 706 of the end cap, which is made of a dielectric material. A portion, e.g., portion 45, of the first metallic component 42 is operatively connected to the interconnect component 26 in FIG. 7 by any suitable methods. In some other embodiments, the interconnect component 26 may comprise a mere wire that operatively connects an unpackaged capacitor to a commutation device. In some of these embodiments, the unpackaged capacitor or the first metallic component of the unpackaged capacitor may be configured in a way such that the first metallic component is directly connected to the corresponding commutation device (e.g., a brush). In these embodiments, the rotatory device does not include the interconnect component between an unpackaged capacitor and its corresponding commutation device.

Figure 8:
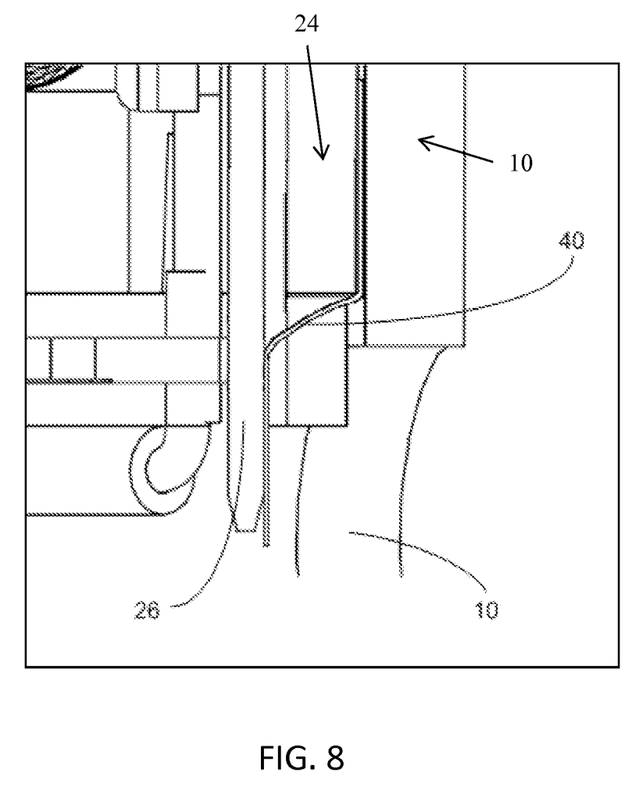
FIG. 8 illustrates a magnified view of the area 202 of an alternative configuration of FIG. 2 in some embodiments.

FIG. 8 illustrates a magnified view of the area 202 of an alternative configuration of FIG. 2 in some embodiments. More specifically, FIG. 8 illustrates the spatial relation between an unpackaged capacitor 40, the motor housing 10, and the interconnect component 26 in some embodiments. In this alternative configuration, rather than wrapping around the bottom portion of the flange 24 as illustrated in FIG. 5, the portion of the unpackaged capacitor 40 is formed with two obtuse bends to provide sufficient resilience or flexibility such that the unpackaged capacitor 40 may properly contact the interconnect component 26 with sufficiently low electrical contact resistance or sufficiently high contact stress. The unpackaged capacitor 40 is also earthed or grounded to the housing 10 of the rotatory device in these illustrated embodiments.

The space-saving characteristics of an exemplary rotatory device having an unpackaged capacitor may be especially advantageous in, for example, miniature electric motors or any other rotatory devices that are subject to strict space constraints while requiring noise or EMI suppression or reduction performances or other performance characteristics (e.g., hysteresis synchronous motors including a phase-shifting capacitor, a capacitor-run motor, a capacitor-start motor, etc.) that may be accomplished through the use of one or more capacitors.

In some embodiments, the EMI performance of the same rotatory device having capacitors in the filter circuitry is better than that of a substantially similar rotatory device (e.g., an identical rotatory device without the filter circuitry) without any capacitors. In addition, some rotatory devices having standard, encapsulated capacitors have demonstrated substantially similar levels of EMI performances to substantially similar rotatory devices having unpackaged capacitors within the frequency ranges of interest.

In addition to the improved noise or EMI suppression or reduction characteristics of rotatory devices having unpackaged capacitors and the advantage of not occupying any useful space, the unpackaged capacitors also exhibit superior temperature performances in some embodiments. For example, some of the unpackaged capacitors described herein have been proven to exhibit a working temperature range of −55° C. to 220° C., instead of the standard −55° C. to 85° C. range for most commercially available through-type or SMD-type encapsulated capacitors. An unpackaged capacitor achieves the high-temperature reliability or stability while exhibit even lower cost than conventional through-type or SMD-type capacitors.

As another example, the cost model of an unpackaged capacitor having 100 pF capacitance and a safe 240° C. operating temperature shows that such an unpackaged capacitor costs about one-tenth of a regular through-type or SMD-type capacitor having only 85° C. maximum operating temperature. The same cost model of an unpackaged capacitor having 100 pF capacitance and a safe 240° C. operating temperature shows that such an unpackaged capacitor costs about one-thirtieth of a regular through-type or SMD-type capacitor having 299° C. maximum operating temperature. Moreover, most commercially available through-type or SMD-type encapsulated capacitors are difficult to ground and require more area as the capacitance increases.

One of the advantages of some embodiments described herein is that regardless of the capacitance within some reasonable range, the unpackaged capacitor merely occupies the space that is generally not used due to the unique geometric configuration of an unpackaged capacitor and thus does not occupy valuable design space. Another advantage of an unpackaged capacitor is that proper grounding such an unpackaged capacitor can be easily accomplished by properly sizing or designing, for example, the flange 24 and the housing of a rotatory device.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A rotatory device for conversion between electrical energy and mechanical energy, comprising:
   an energy conversion element having a rotation shaft;
   a housing comprising a sidewall surrounding the energy conversion element;
   an end cap attached to the housing and comprising a first flange;
   an electric conduction component disposed on the end cap and operatively coupled to the energy conversion element; and
   a first unpackaged capacitor sandwiched between the first flange of the end cap and the housing and having a first metallic component electrically coupled to the electric conduction component and a second metallic component grounded to the housing,
   wherein the first unpackaged capacitor has a cross-sectional profile having two obtuse bends between the first flange and the interior side of the sidewall of the housing.

2. The rotatory device of claim 1, wherein the electric conduction component disposed on the end cap comprises a first brush.

3. The rotatory device of claim 2, wherein the electric conduction component further comprises a first interconnect component disposed on the end cap and connected to the first brush and to the first metallic component of the first unpackaged capacitor.

4. The rotatory device of claim 1, wherein the first unpackaged capacitor further comprises a dielectric component sandwiched between the first metallic component and the second metallic component.

5. The rotatory device of claim 1, wherein the first flange of the end cap extends in a direction parallel to the rotation shaft of the energy conversion element.

6. The rotatory device of claim 1, wherein:
   the housing further includes a flange perpendicular to the rotation shaft of the energy conversion element;
   the first flange of the end cap extends perpendicularly to the rotation shaft of the energy conversion element; and
   the first unpackaged capacitor includes a portion sandwiched between the flange of the housing and the first flange of the end cap.

7. The rotatory device of claim 1, further comprising a second unpackaged capacitor having a first metallic component electrically coupled to the electric conduction component and a second metallic component electrically coupled to the housing, wherein:
   the end cap further has a second flange; and
   the second unpackaged capacitor is sandwiched between the second flange of the end cap and the housing.

8. The rotatory device of claim 7, wherein:
   the electric conduction component includes a first brush and a second brush;
   the first metallic component of the first unpackaged capacitor is electrically coupled to the first brush of the electric conduction component; and
   the first metallic component of the second unpackaged capacitor is electrically coupled to the second brush of the electric conduction component.

9. An electric motor, comprising:
   a rotor and stator assembly having a rotation shaft;
   a commutator attached to the rotation shaft of said rotor stator assembly;
   a housing having a sidewall surrounding said rotor and stator assembly have an open end;
   an end cap attached to the open end of said housing and having a first flange;
   a first brush assembly disposed on said end cap and operatively coupled to said commutator; and
   a first unpackaged capacitor sandwiched between the first flange of said end cap and said housing and having a first metallic component electrically coupled to said first brush assembly and a second metallic component electrically coupled to said housing, wherein
   said housing includes a flange adjacent to the open end thereof and perpendicular to the rotation shaft of said rotor and stator assembly;
   the first flange of the end cap extending perpendicularly to said rotor and stator assembly and secured to the flange of said housing; and
   said first unpackaged capacitor includes a portion sandwiched between the flange of said housing and the first flange of said end cap.

10. The electric motor of claim 9, wherein said first unpackaged capacitor includes a dielectric layer sandwiched between said first metallic component and said second metallic component.

11. The electric motor of claim 9, said first brush assembly including:
   a brush holder attached to said end cap;
   a brush slidably attached to said brush holder; and
   said first metallic component is electrically coupled to said brush of said first brush assembly.

12. The electric motor of claim 9, further comprising an interconnect component disposed on said end cap and electrically connected to said first brush assembly, wherein:
   said first metallic component of said first unpackaged capacitor has a portion in contact with said interconnect component; and
   said second metallic component of said first unpackaged capacitor has a portion in contact with said housing.

13. The electric motor of claim 9, wherein:
   said end cap has the first flange extending parallel to the rotation shaft of said rotor and stator assembly; and
   said first unpackaged capacitor has a cross-sectional profile with multiple bends between the first flange of said end cap and an interior side of the sidewall of said housing with a portion of said second metallic component thereof in contact with the interior side of said housing.

14. The electric motor of claim 13, wherein said first unpackaged capacitor has a cross-sectional profile having two obtuse bends between the first flange and the interior side of the sidewall of said housing.

15. The electric motor of claim 9, further comprising an interconnect component disposed on said end cap and electrically connected to said first brush assembly, wherein:
   said first metallic component of said first unpackaged capacitor has a portion in contact with said interconnect component; and said second metallic component of said first unpackaged capacitor has a portion in contact with said housing.

16. The electric motor of claim 9, further comprising:
a second brush assembly disposed on said end cap and operatively coupled to said commutator; and
a second unpackaged capacitor having a first metallic component electrically coupled to said second brush assembly and a second metallic component electrically coupled to said housing.

17. The electric motor of claim 16, wherein:
said end cap further has a second flange; and
said second unpackaged capacitor is sandwiched between the second flange of said end cap and said housing.

* * * * *